(12) United States Patent
Du et al.

(10) Patent No.: US 11,294,128 B2
(45) Date of Patent: Apr. 5, 2022

(54) OPTICAL MODULE

(71) Applicant: HISENSE BROADBAND MULTIMEDIA TECHNOLOGIES CO., LTD., Shandong (CN)

(72) Inventors: Guangchao Du, Shandong (CN); Dan Li, Shandong (CN); Yongzheng Tang, Shandong (CN); Yunpeng Jiang, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 17/162,159

(22) Filed: Jan. 29, 2021

(65) Prior Publication Data

US 2021/0149131 A1 May 20, 2021

Related U.S. Application Data

(63) Continuation-in-part of application No. PCT/CN2019/093891, filed on Jun. 28, 2019.

(30) Foreign Application Priority Data

Aug. 1, 2018 (CN) .......................... 201810860700.6

(51) Int. Cl.
*G02B 6/42* (2006.01)
*G02B 6/293* (2006.01)

(52) U.S. Cl.
CPC ......... *G02B 6/4251* (2013.01); *G02B 6/2938* (2013.01); *G02B 6/4209* (2013.01); *G02B 6/4246* (2013.01)

(58) Field of Classification Search
CPC ... G02B 6/4251; G02B 6/2938; G02B 6/4209
See application file for complete search history.

(56) References Cited

U.S. PATENT DOCUMENTS

| 8,401,047 B2 | 3/2013 | Takenaka | |
|---|---|---|---|
| 2005/0013126 A1* | 1/2005 | Hwang | H05K 9/002 361/818 |
| 2006/0006403 A1* | 1/2006 | Matsushima | G02B 6/4274 257/433 |

FOREIGN PATENT DOCUMENTS

| CN | 1319773 A | 10/2001 |
|---|---|---|
| CN | 102141652 A | 8/2011 |

(Continued)

OTHER PUBLICATIONS

First Office Action issued in corresponding Chinese Patent Application No. 201810860700.6 dated Apr. 22, 2019, with English translation.

(Continued)

*Primary Examiner* — Sung H Pak
(74) *Attorney, Agent, or Firm* — Morgan, Lewis & Bockius LLP

(57) ABSTRACT

An optical module includes a housing, at least one optical assembly and at least one sealing member. The housing includes a housing body, a cover and at least one vent hole therein. At least part of each optical assembly is located in the housing body. Each sealing member is located at a respective one of the at least one vent hole. The sealing member has a central axis and includes a first cylinder, a truncated cone, and a second cylinder, a diameter of the first cylinder is greater than a diameter of the second cylinder. Each vent hole is a stepped hole including a portion with a first aperture and a portion with a second aperture, the first aperture is greater than the second aperture. The first cylinder fits the portion with the first aperture, and the second cylinder fits the portion with the second aperture.

19 Claims, 7 Drawing Sheets

(56) References Cited

FOREIGN PATENT DOCUMENTS

| CN | 105093461 | A  | 11/2015 |
|----|-----------|----|---------|
| CN | 105759371 | A  | 7/2016  |
| CN | 107193089 | A  | 9/2017  |
| CN | 107219596 | A  | 9/2017  |
| CN | 107577015 | A  | 1/2018  |
| CN | 107966773 | A  | 4/2018  |
| CN | 108873195 | A  | 11/2018 |
| EP | 1 134 604 | A2 | 9/2001  |

OTHER PUBLICATIONS

Second Office Action issued in corresponding Chinese Patent Application No. 201810860700.6 dated Oct. 12, 2019, with English translation.
Third Office Action issued in corresponding Chinese Patent Application No. 201810860700.6 dated Mar. 16, 2020, with English translation.
International Search Report and Written Opinion issued in corresponding International Patent Application No. PCT/CN2019/093891 dated Oct. 8, 2019, with English translation.
Notification to Grant Patent Right for Invention issued in corresponding Chinese Patent Application No. 201810860700.6 dated Jul. 13, 2020, with English translation.

\* cited by examiner

OPTICAL MODULE

CROSS-REFERENCE TO RELATED APPLICATIONS

This application is a Bypass Continuation-in-Part Application of PCT/CN2019/093891 filed on Jun. 28, 2019, which claims priority to Chinese Patent Application No. 201810860700.6 filed on Aug. 1, 2018, which are incorporated herein by reference in their entireties.

TECHNICAL FIELD

The present disclosure relates to the field of optical communication, and in particular, to an optical module.

BACKGROUND

In the field of high-speed data communication, the application of micro-optical assembly technology is becoming more and more extensive. An optical module usually includes a housing, optical components and auxiliary components that are located in the housing. The coupling mode between the optical components and the auxiliary components may be active coupling or passive coupling.

SUMMARY

Embodiments of the present disclosure provides an optical module.

The optical module includes a housing, at least one optical assembly and at least one sealing member.

The housing includes a housing body with an opening and a cover located at the opening, and further includes at least one vent hole therein. At least part of each optical assembly is located in the housing body. Each sealing member is located at a respective one of the at least one vent hole. The sealing member has a central axis, and includes a first cylinder, a truncated cone, and a second cylinder that are connected in sequence along the central axis, a diameter of the first cylinder is greater than a diameter of the second cylinder. Each vent hole is a stepped hole including a portion with a first aperture and a portion with a second aperture, the first aperture is greater than the second aperture. The first cylinder fits the portion with the first aperture, and the second cylinder fits the portion with the second aperture.

BRIEF DESCRIPTION OF THE DRAWINGS

In order to describe technical solutions in the present disclosure more clearly, the accompanying drawings to be used in the description of some embodiments of the present disclosure will be introduced briefly. However, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, and are not limitations on actual dimensions of products and actual processes of methods involved in the embodiments of the present disclosure.

DETAILED DESCRIPTION

Figure 1:
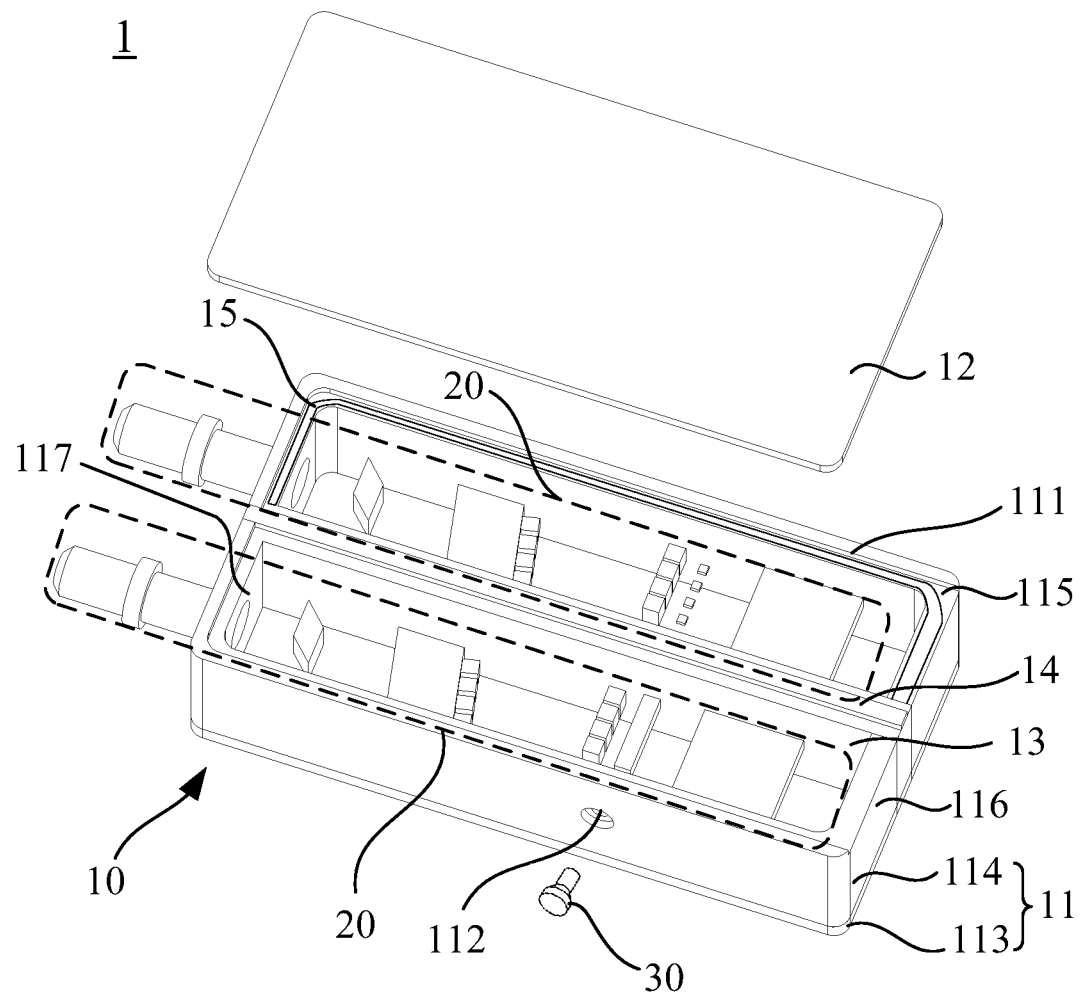
FIG. 1 is a perspective view of an optical module in accordance with some embodiments of the present disclosure.

The technical solutions in embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to." In the description of the specification, the terms "one embodiment", "some embodiments", "exemplary embodiments", "an example" or "some examples" and the like are intended to indicate that specific features, structures, materials, or characteristics related to the embodiment or example are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Below, the terms "first" and "second" are used for descriptive purposes only and are not to be construed as indicating or implying the relative importance or implicitly indicating the number of indicated technical features. Thus, features defined as "first", "second" may explicitly or implicitly include one or more of the features. As used in this description and the appended claims, the singular forms "a," "an," and "the" include plural referents unless the content clearly dictates otherwise. In the description of the embodiments of the present disclosure, "a plurality of/the plurality of" means two or more unless otherwise specified.

In describing some embodiments, "connected" and its derivative expressions may be used. For example, the term "connected" may be used when describing some embodiments to indicate that two or more components are in direct physical contact or electrical contact with each other. In another example, some embodiments may be described using the term "coupled" to indicate that two or more elements are in direct physical or electrical contact. The term "coupled" or "communicatively coupled", however, may also mean that two or more elements are not in direct contact with each other, but yet still co-operate or interact with each other. The embodiments disclosed herein are not necessarily limited to the content herein.

In an optical module provided in an example, a housing of the optical module generally includes a housing body and a cover located at the housing body. For convenience of installing optical components and auxiliary components of the optical module, generally, the optical components and auxiliary components are first installed into the housing body, and then the housing body and the cover are sealed by means of bonding with an adhesive (e.g., glue). Some optical components are sealed inside the housing, so as to work normally and stably for a long time in a complex external environment.

Embodiments of the present disclosure are described in detail below with reference to the drawings of the description.

FIG. 1 is a structural diagram of an optical module in accordance with some embodiments of the present disclosure. As shown in FIG. 1, embodiments of the present disclosure provide an optical module 1 including a housing 10 and at least one optical assembly 20.

Figure 2:
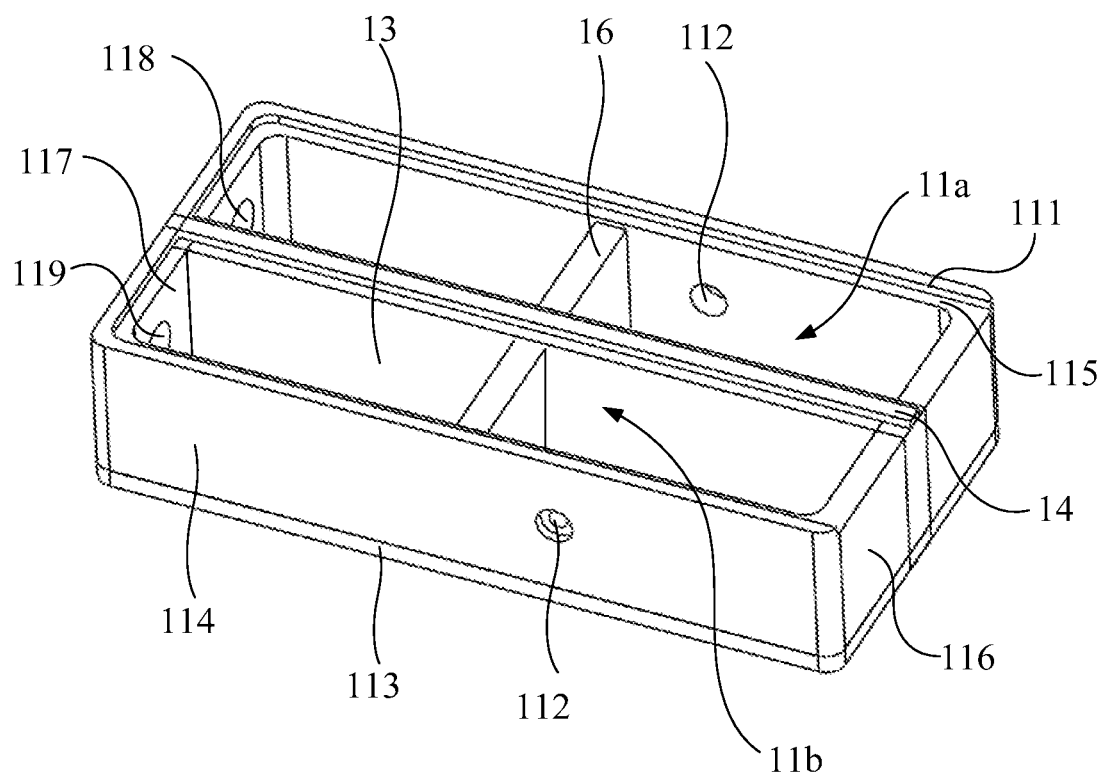
FIG. 2 is a perspective view of a housing body of an optical module in accordance with some embodiments of the present disclosure.

In some embodiments, the housing 10 of the optical module 1 includes a housing body 11 and a cover 12. At least part of each optical assembly 20 is located in the housing body 11. FIG. 2 is a perspective view of the housing body 11 of the optical module 1 in accordance with some embodiments of the present disclosure. As shown in FIGS. 1 and 2, the housing body 11 has an opening 111, and the cover 12 is located at the opening 111 to cover the housing body 11. The housing 10 further includes at least one vent hole 112 therein. Each vent hole 112 communicates a space (i.e., internal space) inside the housing 10 with a space (i.e., external space) outside the housing 10.

It will be understood that, any one of the at least one vent hole 112 may be provided on the housing body 11 or the cover 12. The embodiments of the present disclosure do not limit the number and position of the at least one vent hole 112, as long as the internal space of the housing 10 and the external space of the housing 10 may be communicated through the at least one vent hole 112.

As shown in FIG. 1, the optical module 1 provided by embodiments of the present disclosure further includes at least one sealing member 30. Each vent hole 112 fits one sealing member 30 and is sealed by the sealing member 30.

Figure 3:
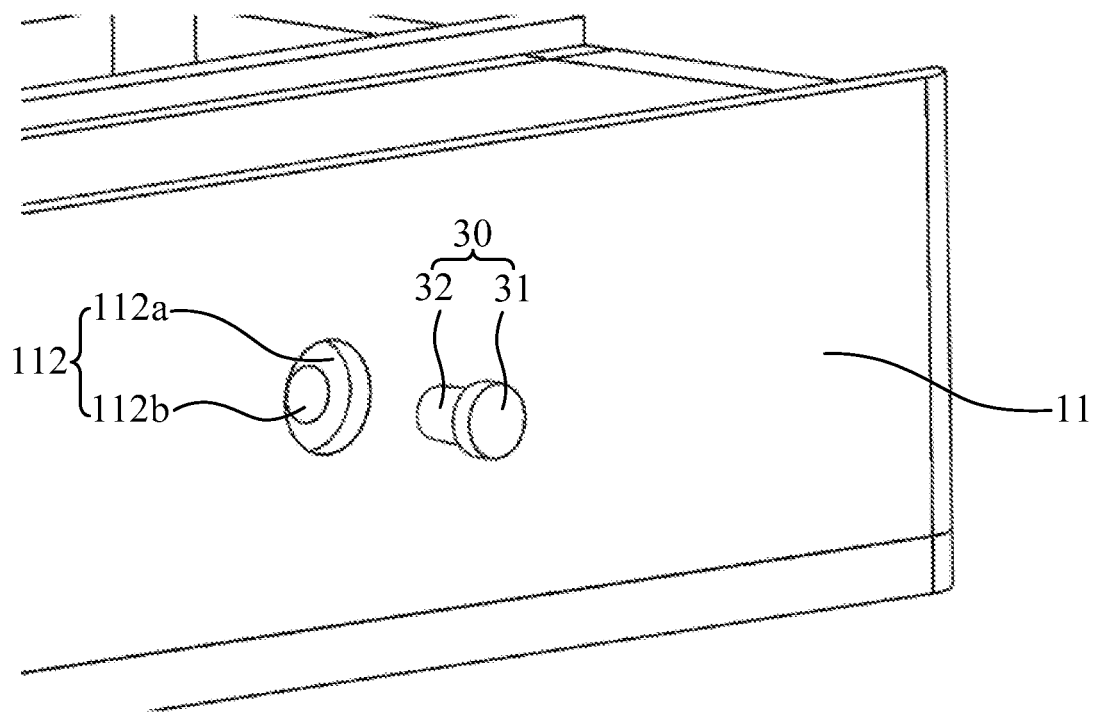
FIG. 3 is a structural diagram illustrating a sealing member and a vent hole of an optical module in accordance with some embodiments of the present disclosure.
Figure 4:
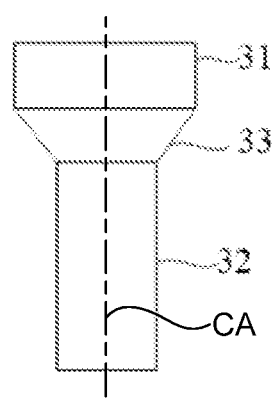
FIG. 4 is a structural diagram of the sealing member of the optical module shown in FIG. 3.

FIG. 3 is a structural diagram of the sealing member 30 and the vent hole 112 of the optical module 1 in accordance with some embodiments of the present disclosure, and FIG. 4 is a structural diagram of the sealing member 30 of the optical module 1 shown in FIG. 3.

In some embodiments, as shown in FIG. 3, the vent hole 112 is a stepped hole including a portion 112a with a first aperture and a portion 112b with a second aperture, and the first aperture is greater than the second aperture. Here, the term "aperture" refers to the diameter of a hole. Accordingly, as shown in FIG. 4, the sealing member 30 has a central axis CA and includes a first cylinder 31, a truncated cone 33, and a second cylinder 32 that are connected in sequence along the central axis CA. A diameter of the first cylinder 31 is greater than a diameter of the second cylinder 32.

As shown in FIGS. 3 and 4, The first cylinder 31 fits the portion 112a with the first aperture, and the second cylinder 32 fits the portion 112b with the second aperture, so as to facilitate an axial locating of the sealing member 30 when fitting the vent hole 112. That is, the first cylinder 31 and the truncated cone 33 are accommodated in the portion 112a, with the first aperture, of the stepped hole, and the second cylinder 32 is accommodated in the portion 112b, with the second aperture, of the stepped hole.

In some embodiments, as shown in FIG. 1, the optical module 1 provided by embodiments of the present disclosure further includes a bonding portion 15 for bonding the cover 12 and the housing body 11. For convenience of bonding the housing body 11 and the cover 12, an end surface of a side wall 114 of the housing body 11 is provided with a receiving groove 115 fitting the cover 12, and the bonding portion 15 is located in the receiving groove 115.

It will be understood that the aforementioned end surface of the side wall 114 refers to a surface, facing the cover 12 with a small area, of the side wall 114. In addition, the housing body 11 shown in FIG. 1 has a plurality of side walls 114, for example, four side walls 114. In some examples, as shown in FIG. 1, the bonding portion 15 is located in receiving grooves 115 on end surfaces of part of the side walls 114. In other examples, receiving grooves 115 on end surfaces of all side walls 114 are connected to form an integrated structure, and the bonding portion 15 is located in the integrated structure. Embodiments of the present disclosure do not limit this, as long as the cover 12 and the housing body 11 may be bonded to each other through the bonding portion 15.

In some embodiments, as shown in FIG. 2, the housing body 11 includes a bottom plate 113, and the side walls 114 are fixed on the bottom plate 113. It will be understood that, the side walls 114 surrounds edges of the bottom plate 113 to form a frame of the housing body 11.

In some embodiments, the bonding portion 15 may be a glue layer formed by applying glue along a bottom of the receiving groove 115, and the glue may be an ultraviolet light (UV) curable structural glue.

In an example, in a process of packaging the cover to the housing body of the housing, a glue is generally needed for bonding. For accelerating the drying of the glue, it is necessary to heat the glue. During the heating process, gas inside the housing expands, which may push the cover apart as the glue has not yet solidified.

In the optical module 1 provided by embodiments of the present disclosure, the housing 10 is provided with the vent hole 112. Therefore, in a process of heating the bonding portion 15 (for example, glue), expanded gas inside the housing body 11 may reach the outside of the housing 10 through the vent hole 112, so that the cover 12 will not be pushed apart due to the expansion of the gas inside the housing 10.

In some embodiments, as shown in FIG. 2, one or more vent hole 112 may be provided on the side walls 114, so as to facilitate the manufacture of the vent hole 112.

It will be understood that, in some other embodiments, the vent hole 112 may be provided on the cover 12 or the bottom plate 113, as long as the vent hole 112 can communicate the internal space and the external space of the housing 10. Of course, although the vent hole 112 is provided on the housing 10, the structural strength of the housing 10 should be ensured to meet the use requirements.

In some embodiments, as shown in FIG. 2, the at least one vent hole 112 includes a plurality of vent holes 112. By providing the plurality of vent holes 112, the expanded gas may be quickly discharged out of the housing 10. Of course, the plurality of vent holes 112 should also ensure that the structural strength of the housing 10 meets the use requirements.

In some embodiments, as shown in FIG. 2, the at least one vent hole 112 includes two vent holes 112, and the two vent holes 112 are provided on a first side wall 116 and a second side wall 117 or on other two opposite side walls among the side walls 114, so that the two vent holes 112 easily achieve convection.

In some embodiments, each sealing member 30 is in interference fit with a corresponding vent hole 112, so that the sealing member 30 and the vent hole 112 are attached to each other as much as possible to improve a sealing effect. In this case, the sealing member 30 may be made of a soft material such as rubber or sponge; or the sealing member 30 may be made of a hard material such as metal or glass.

Figure 5A:
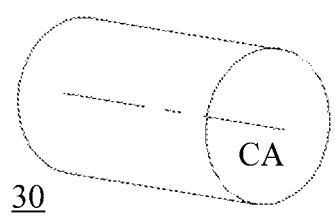
FIG. 5A is a perspective view of a sealing member of an optical module in accordance with some embodiments of the present disclosure.
Figure 5B:
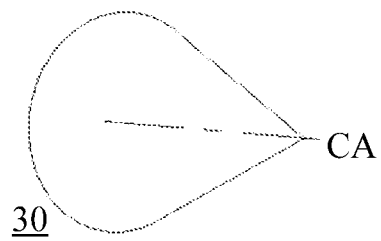
FIG. 5B is a perspective view of a sealing member of another optical module in accordance with some embodiments of the present disclosure.
Figure 5C:
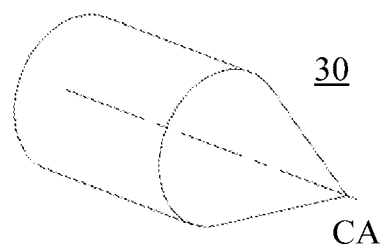
FIG. 5C is a perspective view of a sealing member of yet another optical module in accordance with some embodiments of the present disclosure.
Figure 6:
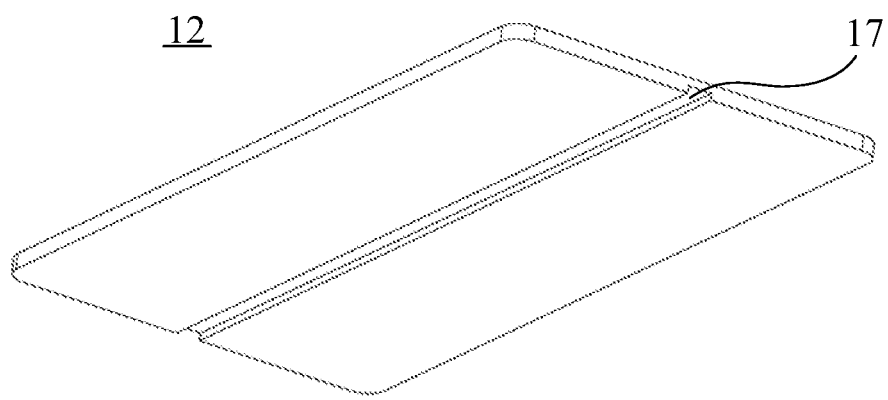
FIG. 6 is a perspective view of a cover of an optical module in accordance with some embodiments of the present disclosure.

In some embodiments, the sealing member 30 may be of any one of the following: a cylindrical structure, a conical structure, or a structure in which a cylindrical structure and a conical structure are combined in an axial direction thereof. As shown in FIG. 5A, the sealing member 30 may be of the cylindrical structure. As shown in FIG. 5B, the sealing member 30 may be of the conical structure. As shown in FIG. 5C, the sealing member 30 may be of the structure in which the cylindrical structure and the conical structure are combined in the axial direction.

In some embodiments, a cross-sectional dimension of the vent hole 112 is slightly greater than a cross-sectional dimension of a portion, fitting the vent hole 112, of the sealing member 30, so as to facilitate the installation of the sealing member 30 in the vent hole 112. The cross section here refers to a cross section along a radial direction of the vent hole 112 or the sealing member 30.

In some embodiments, the cross-sectional dimension of the vent hole 112 is greater than the cross-sectional dimension of the portion fitting the vent hole 112 by a preset parameter. The preset parameter is in a range from 40 μm to 60 μm, such as 40 μm, 43 μm, 45 μm, 48 μm, 50 μm, 52 μm, 55 μm, 58 μm, or 60 μm. This range may not only facilitate the installation of the sealing member 30, but also avoid an excessive gap between the sealing member 30 and the vent hole 112.

It will be noted that, the sealing member 30 and the vent hole 112 may have a gap therebetween. Therefore, a liquid adhesive (such as glue) may be dropped into the gap between the installed sealing member 30 and the vent hole 112 to fill the gap, so as to further improve the sealing effect.

In some embodiments, as shown in FIG. 1, the cover 12 may be made of a transparent material, and the housing body 11 may be made of a metal material. For example, the cover 12 may be a hard glass plate. A thermal expansion coefficient of the hard glass plate is about $7\times10^{-6}$/k, a thermal expansion coefficient of the metal material is about $5\times10^{-6}$/k, and the two values are close. In this case, when the housing 10 is heated, thermal expansion deformations of the cover 12 and the housing body 11 is also close, so that the cover 12 and the housing body 11 may be ensured to be tightly connected.

In some other embodiments, the cover 12 may be made of a non-transparent metal material. In this way, the cover 12 may shield ambient light and reduce influence of the ambient light on optical components inside the housing body 11.

In some embodiments, as shown in FIG. 2, the housing body 11 further includes a partition plate 13, and the aforementioned side walls 114 include a first side wall 116 and a second side wall 117 that are opposite to each other. A first end and a second end of the partition plate 13 respectively abut against the first side wall 116 and the second side wall 117, so as to divide the space in the housing body 11 into a first housing body portion 11a and a second housing body portion 11b.

In some embodiments, as shown in FIG. 2, a convex rib 14 is provided on a side, facing the cover 12, of the partition plate 13, accordingly, a long groove 17 fitting the convex rib 14 is provided on a side, facing the convex rib 14, of the cover 12, so as to ensure that the cover 12 may stably cover the opening 111.

Figure 7:
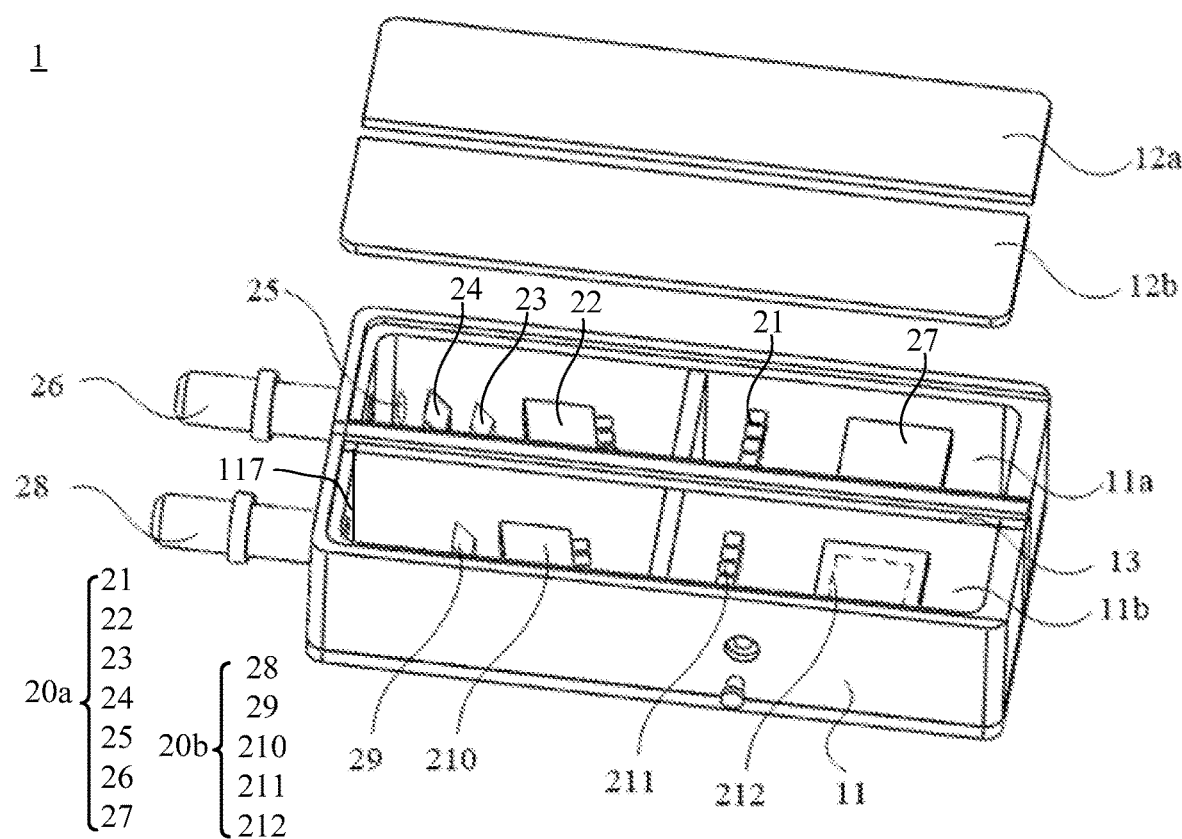
FIG. 7 is a perspective view of an optical module in accordance with some embodiments of the present disclosure.

FIG. 7 is a perspective view of the optical module 1 in accordance with some embodiments of the present disclosure. In some embodiments, as shown in FIG. 7, the at least one optical assembly 20 includes a light emitting assembly 20a and a light receiving assembly 20b. The light emitting assembly 20a and the light receiving assembly 20b may be located in the first housing body portion 11a and the second housing body portion 11b of the housing body 11, respectively. Accordingly, the cover 12 may include a first cover portion 12a and a second cover portion 12b. The first cover portion 12a and the second cover portion 12b respectively located at an opening of the first housing body portion 11a and an opening of the second housing body portion 11b. By dividing the cover 12 into the first cover portion 12a and the second cover portion 12b, and covering the two portions at different positions of the housing body 11, it is facilitated to perform a sealing operation.

It will be noted that, in the optical module 1 shown in FIG. 7, the description is illustrated by taking an example in which the at least one optical assembly 20 includes the light emitting assembly 20a and the light receiving assembly 20b. The embodiments of the present disclosure do not limit the type of the optical assembly 20 included in the at least one optical assembly 20.

In some examples, the at least one optical assembly 20 may include two light emitting assemblies 20a, in this case, the optical assemblies 20 accommodated in the first housing body portion 11a and the second housing body portion 11b are both light emitting assemblies 20a.

In other examples, the at least one optical assembly 20 may include two light receiving assemblies 20b, in this case, the optical assemblies 20 accommodated in the first housing body portion 11a and the second housing body portion 11b are both light receiving assemblies 20b.

In yet other examples, the at least one optical assembly 20 may include one light emitting assembly 20a and one light receiving assembly 20b, in this case, the first housing body portion 11a and the second housing body portion 11b accommodate the light emitting assembly 20a and the light receiving assembly 20b, respectively.

Figure 8:
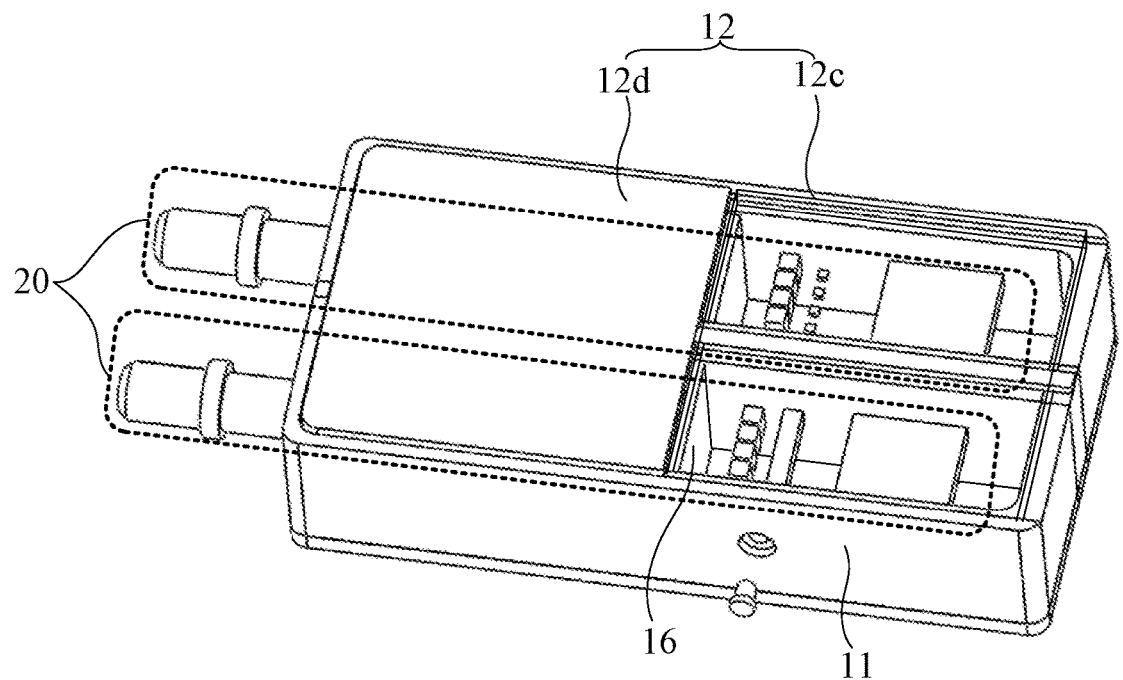
FIG. 8 is a perspective view of another optical module in accordance with some embodiments of the present disclosure.

FIG. 8 is a perspective view of another optical module 1 in accordance with some embodiments of the present disclosure. In some embodiments, as shown in FIG. 8, the cover 12 includes a light-transmitting cover portion 12c and a light-shielding cover portion 12d. The light-transmitting cover portion 12c may be made of a light-transmitting material (such as glass), and the light-shielding cover portion 12d may be made of a light-shielding material (such as non-transparent metal).

In this way, in a case where the optical assembly 20 includes some optical components that need to be observed in their working state or whether they are damaged, part of the cover 12 corresponding to these optical components may be made of a light-transmitting material for easy observing the optical components. Moreover, the performance of the optical components in use may be observed and analyzed without removing the cover 12. In a case where the optical assembly 20 includes some components that do not need to be observed in the working state, part of the cover 12 corresponding to these components may be made of a light-shielding material to reduce the influence of the ambient light on the optical components.

It will be noted that, as shown in FIG. 8, after the light-transmitting cover portion 12c and the light-shielding cover portion 12d of the cover 12 are sealed with the housing body 11, the two portions may have a gap therebetween. Therefore, a support plate 16 may be provided in the housing body 11, and a position of the support plate 16 corresponds to a butt joint of the light-transmitting cover portion 12c and the light-shielding cover portion 12d, so that the gap may be blocked by the support plate 16.

In some examples, the light-transmitting cover portion 12c corresponds to part of a portion, located in the housing body 12, of the light emitting assembly 20a and/or the light receiving assembly 20b; and the light-shielding cover portion 12d corresponds to the remaining part of the portion, located in the housing body 12, of the light emitting assembly 20a and/or the light receiving assembly 20b. That is, light emitted and/or received by the optical assembly 20 will pass through the support plate 16, the support plate 16 may be made of a light-transmitting material for avoid affecting the normal use of the optical assembly 20. The light-transmitting material may be inorganic, such as glass, or may be organic, such as polymethyl methacrylate (PMMA) or polyethylene terephthalate (PET).

Figure 9:
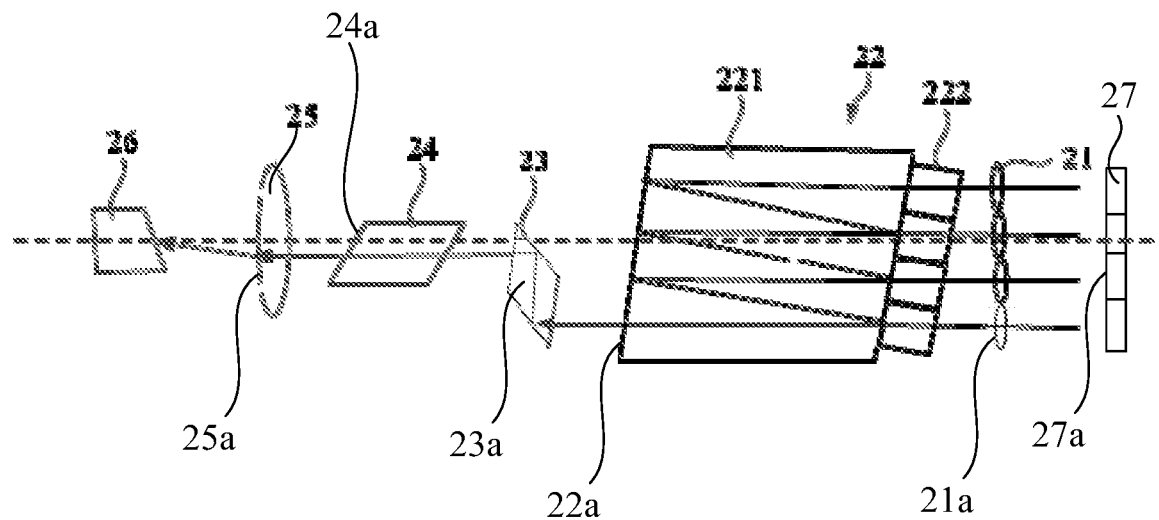
FIG. 9 is an optical path diagram illustrating a light emitting assembly of an optical module in accordance with some embodiments of the present disclosure.

In some embodiments, the at least one optical assembly 20 includes the light emitting assembly 20a. FIG. 9 is an optical path diagram illustrating the light emitting assembly 20a of the optical module 1 in accordance with some embodiments of the present disclosure. As shown in FIGS. 2, 7 and 9, the light emitting assembly 20a includes a plurality of laser emitters 27, a plurality of collimating lenses 21, an optical multiplexer 22, a first displacement prism 23, an optical isolator 24, a focusing lens 25, and a first adapter 26.

In some embodiments, the plurality of laser emitters 27, the plurality of collimating lenses 21, the optical multiplexer 22, the first displacement prism 23, the optical isolator 24 and the focusing lens 25 are located inside the housing body 11 of the housing 10, and the first adapter 26 is located outside one side wall of the housing body 11.

The plurality of laser emitters 27 are located in the housing body 11 for emitting a plurality of light beams. Moreover, the plurality of laser emitters 27 are located proximate to the first side wall 116 of the housing body 11, and an emission direction of the plurality of light beams is from the first side wall 116 to the second side wall 117. In some embodiments, each laser emitter 27 may be a laser chip.

The plurality of collimating lenses 21 are located in the housing body 11 and at a light exit side 27a of the plurality of laser emitters 27. Each of the plurality of collimating lenses 21 corresponds to a respective one of the plurality of laser emitters 27. The plurality of collimating lenses 21 may be fixed on the bottom plate 113. The plurality of light beams emitted by the plurality of laser emitters 27 are incident onto the plurality of collimating lenses 21. The plurality of collimating lenses 21 may respectively collimate the plurality of light beams.

It will be noted that, each collimating lens 21 may be selected according to product requirements. It may be a spherical focusing lens or a self-focusing lens, or it may be an assembled lens array, etc.

The optical multiplexer 22 is located in the housing body 11 and may be fixed on the bottom plate 113. The optical multiplexer 22 is located at a light exit side 21a of the plurality of collimating lenses 21, and may combine a plurality of collimated light beams passing through the plurality of collimating lenses 21 into one light beam.

In some embodiments, the optical multiplexer 22 may be a filter multiplexer. As shown in FIG. 9, the optical multiplexer 22 includes a glass carrier 221 with a reflective film formed on one side thereof and a plurality of narrowband filters 222. The optical multiplexer 22 may adjust corresponding split wavelength bands of the optical multiplexer 22 by adding or reducing the narrowband filter 222 as required. For example, in a case where the number of the laser emitters 27 is four, the optical multiplexer 22 includes four narrowband filters 222 accordingly. The optical multiplexer 22 may select combinate four light beams, and finally the combined light beam exits from an light exit side 22a of the optical multiplexer 22.

The first displacement prism 23 is located in the housing body 11 and at the light exit side 22a of the optical multiplexer 22. The first displacement prism 23 may be fixed on the bottom plate 113. After passing through the first displacement prism 23, a propagation path of the combined light beam may be adjusted to change a position thereof, thereby facilitating the installation of other optical components. For example, the first displacement prism 23 may be a total reflection mirror.

The optical isolator 24 is located in the housing body 11 and may be fixed on the bottom plate 113. The optical isolator 24 is located at a light exit side 23a of the first displacement prism 23. The optical isolator 24 has a feature of allowing a light beam to propagate in one direction. When the light beam passes through the plurality of components of the light emitting assembly 20a, it is easy to generate reflected light in an opposite direction. The optical isolator 24 is located at the light exit side 23a of the first displacement prism 23, it can allow a light beam passing through the first displacement prism 23 to pass through in one direction, which prevents the reflected light from being transmitted from the optical isolator 24 to the first displacement prism 23, and prevents the reflected light from affecting a transmission quality of an optical signal.

The focusing lens 25 is located in the housing body 11 and may be fixed on the bottom plate 113. The focusing lens 25 is located at a light exit side 24a of the optical isolator 24 and may focus the light beam, which ensures the intensity of the light beam.

The first adapter 26 is located on a side, facing away from the first side wall 116, of the second side wall 117. That is, the first adapter 26 is located on an outer side of the second side wall 117 of the housing body 11. The second side wall 117 includes a first light through hole 118 therein, and the first adapter 26 is located at the first light through hole 118. The first adapter 26 directly faces a light exit side 25a of the focusing lens 25. The first adapter 26 is coupled with an optical fiber, and can introduce an optical signal emitted by the laser emitters 27 into the optical fiber through the above optical components. The first adapter 26 may be fixed on the second side wall 117 by welding, bonding or other approaches, which is not limited here.

The above description is only an example to illustrate the specific structure of the light emitting assembly 20a. The structure of the light emitting assembly 20a is not limited to the above structures provided by the embodiments of the present disclosure, and may also be other structures known to a person skilled in the art, which is not limited here.

Figure 10:
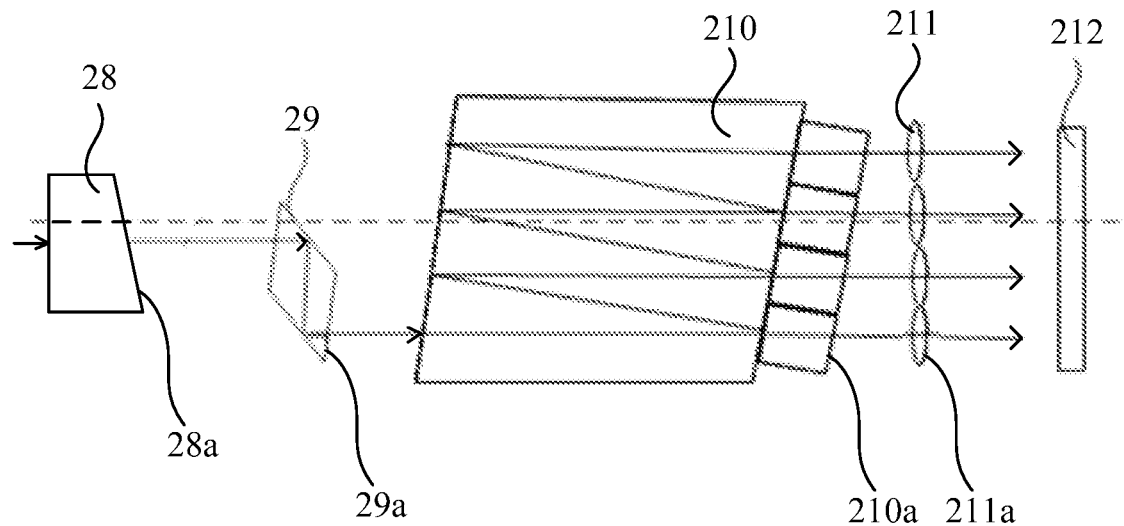
FIG. 10 is an optical path diagram illustrating a light receiving assembly of an optical module in accordance with some embodiments of the present disclosure.

FIG. 10 is an optical path diagram illustrating the light receiving assembly 20b of the optical module 1 in accordance with some embodiments of the present disclosure. In some embodiments, the at least one optical assembly 20 includes the light receiving assembly 20b. As shown in FIGS. 2, 7, and 10, the light receiving assembly 20b includes a second adapter 28, a second displacement prism 29, an optical demultiplexer 210, a condensing lens 211, and a photo sensor 212.

The second adapter 28 is located on the outer side of the second side wall 117 of the housing body 11, and the second side wall 117 includes a second light through hole 119 therein. The second adapter 28 is located at the second light through hole 119 and coupled with an optical fiber, and can convert light from the optical fiber into parallel light.

The second displacement prism 29 is located in the housing body 11 and at a light exit side 28a of the second adapter 28, and can change a position of the parallel light. For example, the second displacement prism 29 may be a total reflection mirror.

The optical demultiplexer 210 is located in the housing body 11 and at a light exit side 29a of the second displacement prism 29, and can divide the received parallel light into a plurality of light beams according to different wavelengths.

The condensing lens 211 is located in the housing body 11 and at a light exit side 210a of the optical demultiplexer 210, and can converge a plurality of light beams with different wavelengths.

The photo sensor 212 is located in the housing body 11 and at a light exit side 211a of the condensing lens 211, and can convert the converged light beams (i.e., optical signal) into an electrical signal. For example, the photo sensor 212 is a photodiode.

The above description is only an example to illustrate the specific structure of the light receiving assembly 20b, and in specific implementation, the structure of the light receiving assembly 20b is not limited to the above structure provided by the embodiments of the present disclosure, and may also be other structures known to a person skilled in the art, which is not limited here.

Figure 11:
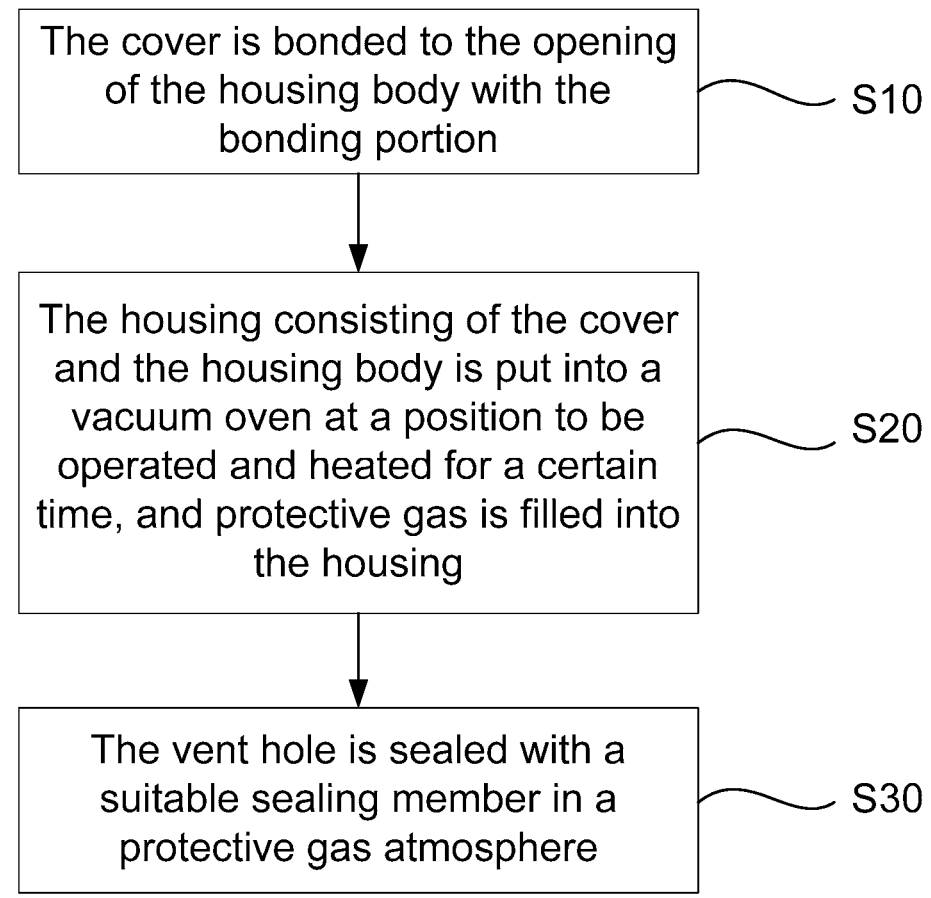
FIG. 11 is a flowchart illustrating a method for manufacturing an optical module in accordance with some embodiments of the present disclosure.

FIG. 11 is a flowchart illustrating a method for manufacturing the optical module 1 in accordance with some embodiments of the present disclosure. For controlling a gas composition inside the housing 10 of the optical module 1 and preventing the optical components of the optical module 1 from being oxidized, the following sealing step 10 to step 30 (S10 to S30) as shown in FIG. 11 may be adopted.

In S10, the cover 12 is bonded to the opening 111 of the housing body 11 with the bonding portion 15 (e.g., glue).

In S20, the housing 10 consisting of the cover 12 and the housing body 11 is put into a vacuum oven at a position to be operated and heated for a certain time (e.g., about 1 hour), and protective gas is filled into the housing 10. Here, the protective gas includes nitrogen ($N_2$), or may be an inert gas such as argon (Ar) or neon (Ne), as long as it may protect the optical components in the housing 10 and prevent them from being oxidized.

In S30, the vent hole 112 is sealed with a suitable sealing member 30 in a protective gas atmosphere.

In this case, the inside of the housing 10 is filled with the protective gas to prevent the optical components of the optical module 1 from being oxidized, and the optical components inside the housing 10 may also work normally in the protective gas.

The specific structure and sealing method of the optical module 1 of some embodiment of the present disclosure may have at least the following advantages.

First, the optical module 1 in the embodiments of the present disclosure adopts a method of sealing the cover 12 first and then sealing the vent hole 112, thereby solving a problem that the cover 12 is easy to be pushed apart in the process of heating glue.

Second, the optical module 1 in the embodiments of the present disclosure is heated in the protective gas atmosphere, so that oxygen and moisture inside the housing 10 are discharged by the protective gas, which ensures that the inside of the housing 10 is in the protective gas atmosphere, and prevents the optical components inside the housing 10 from being oxidized and damaged. Moreover, by sealing the vent hole 112 in the protective gas atmosphere, it is possible to avoid a leakage of the protective gas inside the housing 10. In this regard, the housing 10 provides a hermetic seal for the at least part of each optical assembly being located in the housing body 11. In one example, the protective gas sealed inside the housing 10 is different from the atmosphere.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be subject to the protection scope of the claims.

What is claimed is:

1. An optical module, comprising:
   a housing comprising a housing body with an opening and a cover located at the opening, and further comprising at least one hole therein;
   at least one optical assembly, at least part of each optical assembly being located in the housing body; and
   at least one sealing member each being located at a respective one of the at least one hole; wherein
   each sealing member has a central axis, and comprises a first cylinder, a truncated cone, and a second cylinder that are connected in sequence along the central axis, a diameter of the first cylinder is greater than a diameter of the second cylinder;
   each hole is a stepped hole comprising a portion with a first aperture and a portion with a second aperture, the first aperture is greater than the second aperture; and
   the first cylinder fits the portion with the first aperture, and the second cylinder fits the portion with the second aperture.

2. The optical module according to claim 1, wherein the at least one hole is located on a side wall of the housing body.

3. The optical module according to claim 1, wherein each sealing member is in interference fit with the respective hole.

4. The optical module according to claim 1, wherein a cross-sectional dimension of each hole is slightly greater than a cross-sectional dimension of a portion, fitting the hole, of the respective sealing member.

5. The optical module according to claim 4, wherein the cross-sectional dimension of each hole is greater than the cross-sectional dimension of the portion fitting the hole by a preset parameter in a range from 40 µm to 60 µm.

6. The optical module according to claim 1, wherein the at least one hole comprises a plurality of holes.

7. The optical module according to claim 6, wherein the plurality of holes comprises two holes located on a first side wall of the housing body and a second side wall, opposite to the first side wall, of the housing body.

8. The optical module according to claim 1, further comprising a bonding portion for bonding the cover and the housing body; wherein
an end surface of a side wall of the housing body comprises a receiving groove thereon, and the receiving groove fits the cover and accommodates the bonding portion.

9. The optical module according to claim 1, wherein the cover includes a transparent plate.

10. The optical module according to claim 1, wherein the housing body comprises a partition plate, a first side wall and a second side wall that are opposite to each other; wherein
a first end and a second end of the partition plate abut against the first side wall and the second side wall, respectively.

11. The optical module according to claim 10, wherein the housing body further comprises a convex rib provided on a side of the partition plate facing the cover.

12. The optical module according to claim 10, wherein the at least one optical assembly comprises at least one of a light emitting assembly or a light receiving assembly.

13. The optical module according to claim 12, wherein the second side wall comprises a first light exit hole therein; and
the at least one optical assembly comprises the light emitting assembly, and the light emitting assembly comprises:
a plurality of laser emitters located in the housing body and proximate to the first side wall, the plurality of laser emitters being configured to emit a plurality of light beams;
a plurality of collimating lenses located in the housing body and at a light exit side of the plurality of laser emitters, each collimating lense corresponding to a respective one of the plurality of laser emitters, and the plurality of collimating lenses being configured to collimate the plurality of light beams;
an optical multiplexer located in the housing body and at a light exit side of the plurality of collimating lenses, the optical multiplexer being configured to combine a plurality of light beams passing through the plurality of collimating lenses into one light beam;
a first displacement prism located in the housing body and at a light exit side of the optical multiplexer, the first displacement prism being configured to adjust a light exit position of the light beam;
an optical isolator located in the housing body and at a light exit side of the first displacement prism, the optical isolator being configured to allow a light beam passing through the first displacement prism to propagate in one direction;
a focusing lens located in the housing body and at a light exit side of the optical isolator, the focusing lens being configured to focus a light beam passing through the optical isolator; and
a first adapter located on a side, facing away from the first side wall, of the second side wall and located at the first light exit hole, the first adapter being configured to lead the light beam out of the light emitting assembly.

14. The optical module according to claim 12, wherein the second side wall comprises a second light exit hole therein; and
the at least one optical assembly comprises the light receiving assembly, the light receiving assembly comprises:
a second adapter located on a side, facing away from the first side wall, of the second side wall and located at the second light exit hole, the second adapter being configured to provide a parallel light beam;
a second displacement prism located in the housing body and at a light exit side of the second adapter, the second displacement prism being configured to adjust a light exit position of the parallel light beam;
an optical demultiplexer located in the housing body and at a light exit side of the second displacement prism, the optical demultiplexer being configured to divide one light beam passing through the second displacement prism into a plurality of light beams;
a condensing lens located in the housing body and at a light exit side of the optical demultiplexer, the condensing lens being configured to converge the plurality of light beams; and
a photo sensor located in the housing body and at a light exit side of the condensing lens, the photo sensor being configured to convert light beams passing through the condensing lens into an electric signal.

15. The optical module according to claim 12, wherein the at least one optical assembly comprises the light emitting assembly and the light receiving assembly that are located at two sides of the partition plate.

16. The optical module according to claim 15, wherein
a space in the housing body is divided into a first housing body portion and a second housing body portion by the partition plate; wherein
at least part of the light emitting assembly is located in the first housing body portion, and at least part of the light receiving assembly is located in the second housing body portion; and
the cover comprises a first cover portion and a second cover portion that are independent of each other; wherein
the first cover portion covers the first housing body portion, and the second cover portion covers the second housing body portion.

17. The optical module according to claim 12, wherein the cover comprises a light-transmitting cover portion and a light-shielding cover portion that cover on different parts of the at least one optical assembly, respectively.

18. The optical module according to claim 1, wherein the housing provides a hermetic seal for the at least part of each optical assembly being located in the housing body.

19. The optical module according to claim 1, further comprising an adhesive bonding the at least one sealing member to the respective one of the at least one hole.

* * * * *